(12) United States Patent  
Lv

(10) Patent No.: US 10,424,094 B2
(45) Date of Patent: Sep. 24, 2019

(54) PROCESSING SCREEN SENSITIVE INFORMATION

(71) Applicant: Alibaba Group Holding Limited, Grand Cayman (KY)

(72) Inventor: Kun Lv, Zhejiang (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 15/481,215

(22) Filed: Apr. 6, 2017

(65) Prior Publication Data

US 2017/0213369 A1 Jul. 27, 2017

Related U.S. Application Data

(63) Continuation of application No. PCT/CN2015/091215, filed on Sep. 30, 2015.

(30) Foreign Application Priority Data

Oct. 14, 2014 (CN) .......................... 2014 1 0542077

(51) Int. Cl.
*G06T 11/20* (2006.01)
*G06F 21/84* (2013.01)
*G06F 3/01* (2006.01)

(52) U.S. Cl.
CPC ............ *G06T 11/206* (2013.01); *G06F 3/017* (2013.01); *G06F 21/84* (2013.01)

(58) Field of Classification Search
None
See application file for complete search history.

(56) References Cited

U.S. PATENT DOCUMENTS

| 2005/0212761 A1* | 9/2005 | Sawada .................. G06F 21/10 345/156 |
| 2011/0179366 A1 | 7/2011 | Chae |
| 2012/0036452 A1* | 2/2012 | Coleman ................. G06F 21/55 715/751 |
| 2013/0265135 A1 | 10/2013 | Chang |

(Continued)

FOREIGN PATENT DOCUMENTS

| CN | 1745407 A | 3/2006 |
| CN | 102855453 | 1/2013 |

(Continued)

OTHER PUBLICATIONS

Translation of International Search Report from corresponding PCT application No. PCT/CN2015/091215 dated Dec. 30, 2015, 2 pages.

(Continued)

*Primary Examiner* — Xin Sheng
(74) *Attorney, Agent, or Firm* — Lee & Hayes, P.C.

(57) ABSTRACT

Example embodiments of the present disclosure provide a screen sensitive information processing method and apparatus. The method includes monitoring whether light intensity detected by a light sensor increases to a first threshold, and when it is monitored that the light intensity increases to the first threshold, identifying an area where predefined sensitive information in display content of a screen is located, and masking content displayed in the area where the sensitive information is located. The example embodiments of the present disclosure improve security of information reading for users.

16 Claims, 8 Drawing Sheets

(56) References Cited

U.S. PATENT DOCUMENTS

2014/0283100 A1   9/2014   Harrison
2014/0359785 A1 * 12/2014  Chandra .................. G06F 21/60
                                                          726/27

FOREIGN PATENT DOCUMENTS

| | | |
|---|---|---|
| CN | 102902703    | 1/2013 |
| CN | 103077361    | 5/2013 |
| CN | 103402001    | 11/2013 |
| CN | 103955650    | 7/2014 |
| CN | 103973891 A  | 8/2014 |
| CN | 104050422 A *| 9/2014 ............. G06F 21/62 |
| JP | 2001005787 A | 1/2001 |
| JP | 2005107306   | 4/2005 |
| JP | 2009237574 A | 10/2009 |
| JP | 2010010750   | 1/2010 |
| JP | 2011134137 A | 7/2011 |
| JP | 2011228872   | 11/2011 |
| JP | 2012252426 A | 12/2012 |
| JP | 2013020522 A | 1/2013 |

OTHER PUBLICATIONS

Translation of Written Opinion from corresponding PCT application No. PCT/CN2015/091215 dated Dec. 30, 2015, 6 pages.
Translated Search Report from corresponding Chinese patent application No. 2014105420771, dated Jan. 22, 2018, 2 pages.
Translated Supplementary Search Report from corresponding Chinese patent application No. 2014105420771, dated Jul. 10, 2018, 2 pages.
The Extended European Search Report dated May 28, 2018, for European Application No. 15850987.7, 9 pages.
The Japanese Office Action dated Feb. 12, 2019 for Japanese Patent Application No. 2017-519890, a counterpart of U.S. Appl. No. 15/481,215, 6 pages.
Translated Office Action from corresponding Chinese patent application No. 2014105420771, dated Jan. 29, 2019, 13 pages.
Translated Office Action from corresponding Chinese patent application No. 2014105420771, dated Jul. 18, 2018, 13 pages.
Translation of Japan Notice of Allowance from corresponding JP Patent Application No. 2017-519890, dated Jun. 25, 2019, 6 pages.

* cited by examiner

PROCESSING SCREEN SENSITIVE INFORMATION

CROSS REFERENCE TO RELATED PATENT APPLICATIONS

This application claims priority to and is a continuation of PCT Patent Application No. PCT/CN2015/091215, filed on 30 Sep. 2015, which claims priority to Chinese Patent Application No. 201410542077.1, filed on 14 Oct. 2014, entitled "METHOD AND APPARATUS FOR PROCESSING SCREEN SENSITIVE INFORMATION," which are hereby incorporated by reference in their entirety.

TECHNICAL FIELD

The present disclosure relates to the field of information processing technologies, and in particular, to a screen information processing method and apparatus.

BACKGROUND

With the rapid development of electronic technologies, electronic devices such as mobile phones, tablets, and computers are more widely applied to people's daily study, work, and lives. In using an electronic device, the screen is a major means through which people acquire various information. However, in conventional techniques, various information includes some personal privacy-related sensitive information, which is generally presented on the screen directly and is easily spied by other people, causing leakage of personal information and bringing about unnecessary trouble to people's life.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of example embodiments of the present disclosure is to provide a screen sensitive information processing method and apparatus, to protect information displayed on a screen of an electronic device from peeping, and to improve security of information viewing for users.

To achieve the foregoing objective, an example embodiment of the present disclosure provides a screen sensitive information processing method, including:

monitoring whether light intensity detected by a light sensor increases to a first threshold, and when it is monitored that the light intensity increases to the first threshold, identifying an area where predefined sensitive information in display content of a screen is located, and masking content displayed in the area where the sensitive information is located.

In an example embodiment, the method further includes: monitoring whether the light intensity detected by the light sensor decreases to a second threshold, and when it is monitored that the light intensity decreases to the second threshold, identifying the masked area where the sensitive information is located, and canceling masking of the area where the sensitive information is located.

In an example embodiment, the masking content displayed in the area where the sensitive information is located includes: displaying a rectangular picture in the area where the sensitive information is located.

In an example embodiment, the masking content displayed in the area where the sensitive information is located includes:

rendering the rectangular picture, and displaying the rendered rectangular picture in the area where the sensitive information is located, the rectangular picture covering original display content in the area where the sensitive information is located.

In an example embodiment, the masking content displayed in the area where the sensitive information is located includes: setting a background color attribute of the area where the sensitive information is located to be a sensitive information color attribute.

In an example embodiment, the canceling masking of the area where the sensitive information is located includes: displaying, in the area where the sensitive information is located, the sensitive information of the area.

In an example embodiment, the canceling masking of the area where the sensitive information is located includes: rendering original display content in the display content of the screen.

In an example embodiment, the canceling masking of the area where the sensitive information is located includes: setting a background color of the area where the sensitive information is located to be an original background color attribute of the area.

Another aspect of the present disclosure further provides a screen sensitive information processing apparatus, the apparatus including:

a first monitoring unit configured to monitor whether light intensity detected by a light sensor increases to a first threshold;

a first identification unit configured to identify, when the first monitoring unit monitors that the light intensity increases to the first threshold, an area where predefined sensitive information in display content of a screen is located; and a first masking unit configured to mask, after the first identification unit identifies the area where the predefined sensitive information is located in the display content of the screen, content displayed in the area where the sensitive information is located.

In an example embodiment, the apparatus further includes:

a second monitoring unit configured to monitor whether the light intensity detected by the light sensor decreases to a second threshold;

a second identification unit configured to identify, when the second monitoring unit monitors that the light intensity decreases to the second threshold, the area where the predefined sensitive information is located in the display content of the screen; and a second masking unit configured to cancel, after the second identification unit identifies the area where the predefined sensitive information is located in the display content of the screen, masking of the area where the sensitive information is located.

Another aspect of the present disclosure further provides one or more memories stored thereon computer-executable instructions that, when executed by one or more processors, cause the one or more processors to perform acts comprising:

monitoring that light intensity detected by a light sensor increases to a first threshold;

identifying an area where predefined sensitive information in display content of a screen is located;

masking content displayed in the area where the sensitive information is located, the masking including setting a background color attribute of the area where the sensitive information is located to be a sensitive information color attribute that that masks the sensitive information;

monitoring that the light intensity detected by the light sensor decreases to a second threshold; and canceling masking of the area where the sensitive information is located, the canceling including setting the background color of the area where the sensitive information is located to be an original background color attribute of the area.

As can be seen from the technical solutions provided by the example embodiments of the present disclosure, the example embodiments of the present disclosure achieve the function of protecting sensitive information by identifying an area where predefined sensitive information in display content of a screen is located and masking content displayed in the area where the sensitive information is located, which significantly improves the security of information viewing for users compared with the conventional techniques.

BRIEF DESCRIPTION OF DRAWINGS

To describe the technical solutions in the example embodiments of the present disclosure more clearly, the accompanying drawings required for illustrating the example embodiments or the conventional techniques will be introduced briefly below. Apparently, the drawings in the following description are only some example embodiments in the present disclosure, and those of ordinary skill in the art may further obtain other drawings according to these accompanying drawings without paying creative efforts.

DETAILED DESCRIPTION

To help those in the art better understand the technical solutions in the present disclosure, the technical solutions in the example embodiments of the present disclosure will be described clearly and completely in conjunction with the accompanying drawings in the example embodiments of the present disclosure. Apparently, the described example embodiments only represent some of the example embodiments rather than all of the example embodiments of the present disclosure. All other example embodiments obtained by those of ordinary skill in the art based on the example embodiments in the present disclosure without paying creative efforts shall fall in the protection scope of the present disclosure.

When a current electronic device is in use, user information will be directly presented on the screen, which makes it extremely easy to spy the user information, causing leakage of some sensitive privacy information and bringing about unnecessary trouble to users.

Figure 1:
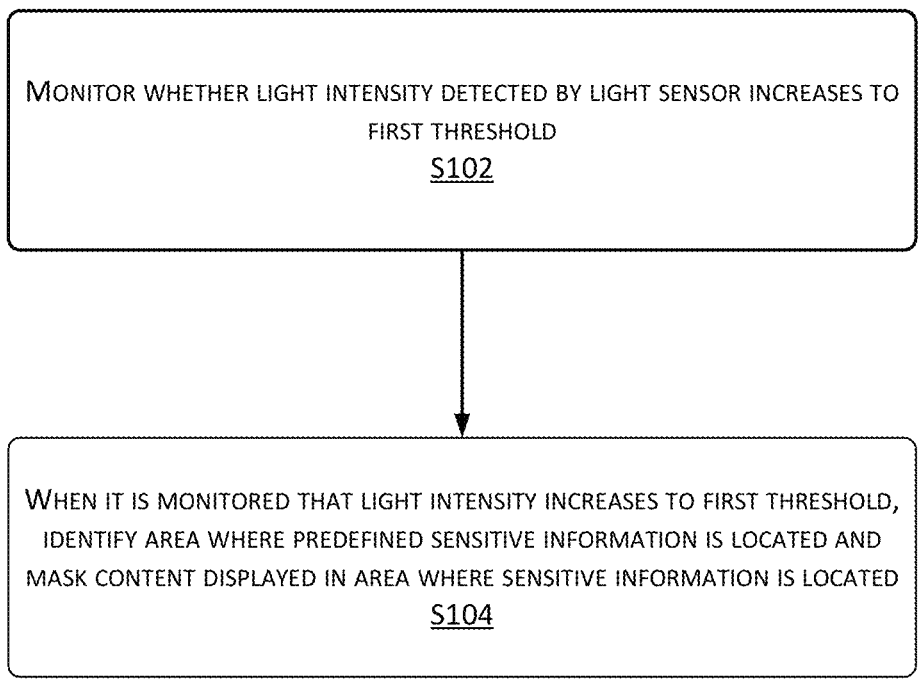
FIG. 1 is a schematic flowchart of a screen sensitive information processing method according to an example embodiment of the present disclosure.

To solve the foregoing problem, an example embodiment of the present disclosure provides a screen sensitive information processing method. As shown in FIG. 1, the method includes:

Step S102: It is monitored whether light intensity detected by a light sensor increases to a first threshold.

Step S104: When it is monitored that the light intensity increases to the first threshold, an area where predefined sensitive information in display content of a screen is located is identified, and content displayed in the area where the sensitive information is located is masked.

As can be seen, in this example embodiment of the present disclosure, when it is monitored that the light intensity increases to the first threshold, the area where the predefined sensitive information is located in the display content of the screen may be identified, and the content displayed in the area where the sensitive information is located may be masked, which can effectively prevent leakage of sensitive information of a user, and security of information viewing is significantly improved for the user compared with the conventional techniques.

In practice, there may be multiple implementations of masking the sensitive information displayed on the screen, and specific implementations of the example embodiments of the present disclosure are described below in detail by using several specific examples.

Example Embodiment 1

Figure 2:
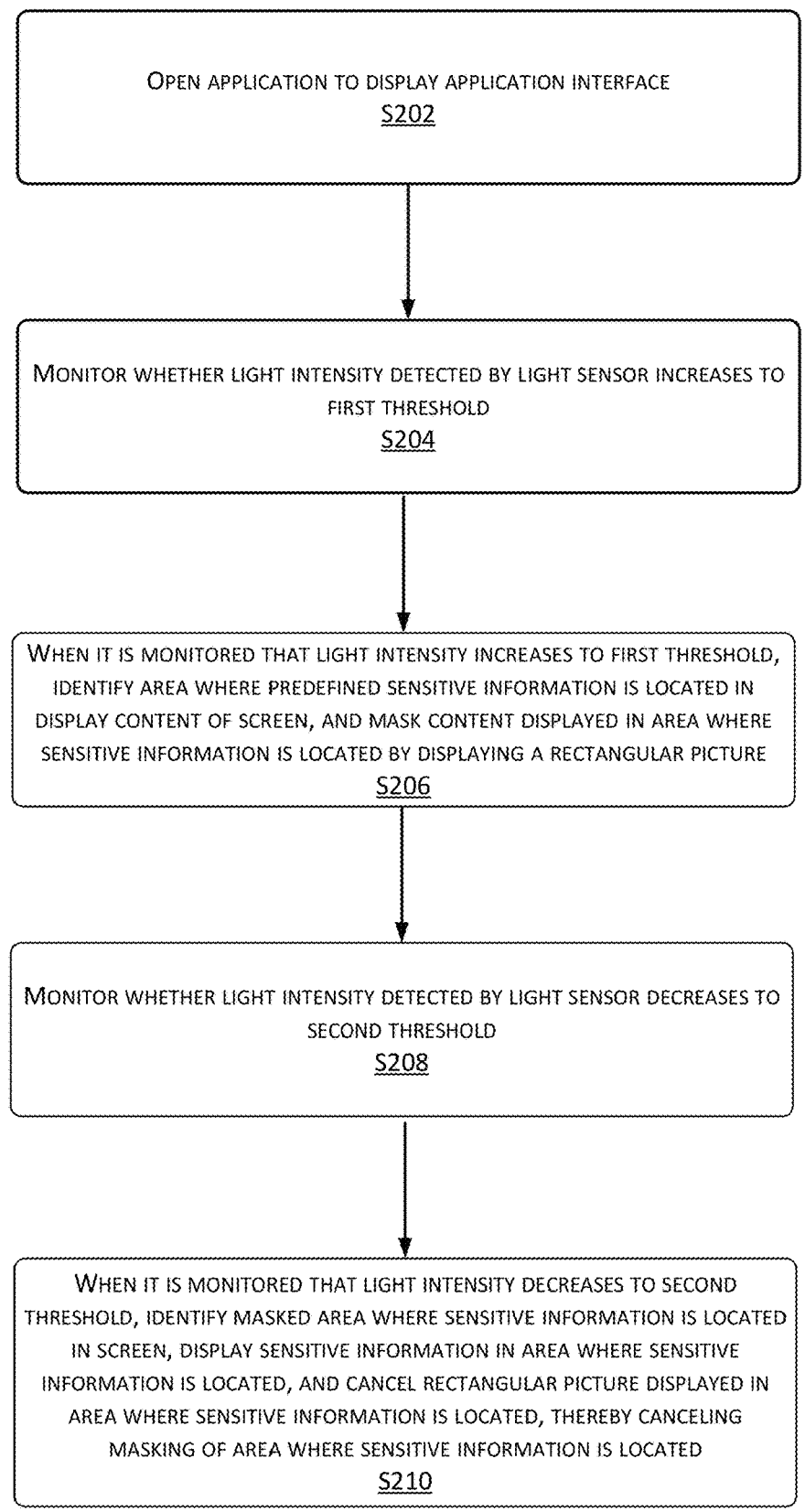
FIG. 2 is a schematic flowchart of a screen sensitive information processing method according to example embodiment 1 of the present disclosure.

FIG. 2 is a schematic flowchart of a screen sensitive information processing method according to this example embodiment. The screen sensitive information processing method may be applied to any electronic device that can display information, such as a mobile smart phone, a tablet electronic device, a portable computer (such as a notebook computer), a personal digital assistant (PDA), a laptop computer, or other devices that can display information through a screen. Applications corresponding to information displayed on the screen include, but are not limited to, a social platform application (such as Facebook, Twitter, or Weibo), an email application, a short messaging service (SMS) application, a multimedia messaging service (MMS) application, and the like.

As shown in FIG. 2, the screen sensitive information processing method includes the following steps:

Step S201: An electronic device 1 opens an application, and a screen 10 displays information of a current application page.

Figure 3:
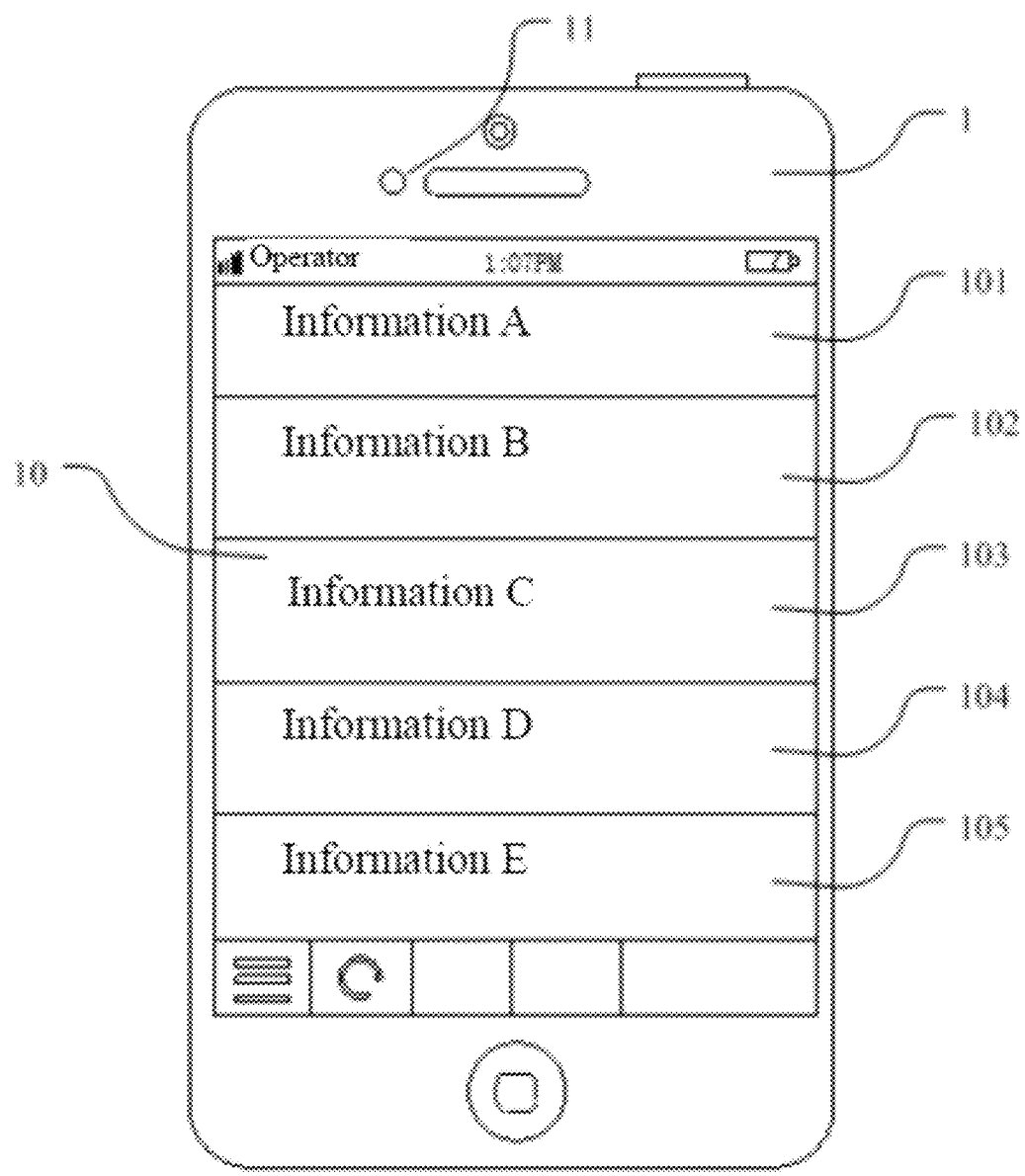
FIG. 3 is a schematic diagram of an initial display state of an electronic device, in which a mobile phone is used as an example.

FIG. 3 displays content displayed on the screen 10 after the electronic device 1 opens the application, and it is assumed that all information currently displayed on the screen 10 includes information A 101, information B 102, information C 103, information D 104, and information E 105, wherein the information A 101 is predefined sensitive information.

Step S204: It is monitored whether light intensity detected by a light sensor 11 increases to a first threshold.

In practice, the current application may monitor ambient light intensity by invoking a light sensor API of the electronic device 1. The light sensor API of the electronic device 1 cannot be invoked to monitor the light intensity until the application is started; therefore, when the application is just started in step S201, an initial display state of the screen 10 is a state in which sensitive information is not masked; after the light sensor API of the electronic device is invoked, if the detected light intensity is lower than the first threshold, the current page is continued to be displayed, and if the monitored light intensity is higher than the first threshold, step S206 is performed.

Step S206: When it is monitored that the light intensity increases to the first threshold, an area where sensitive information is located is identified in display content of the screen 10, and content displayed in the area where the sensitive information is located is masked by displaying a rectangular picture 101'.

Figure 4:
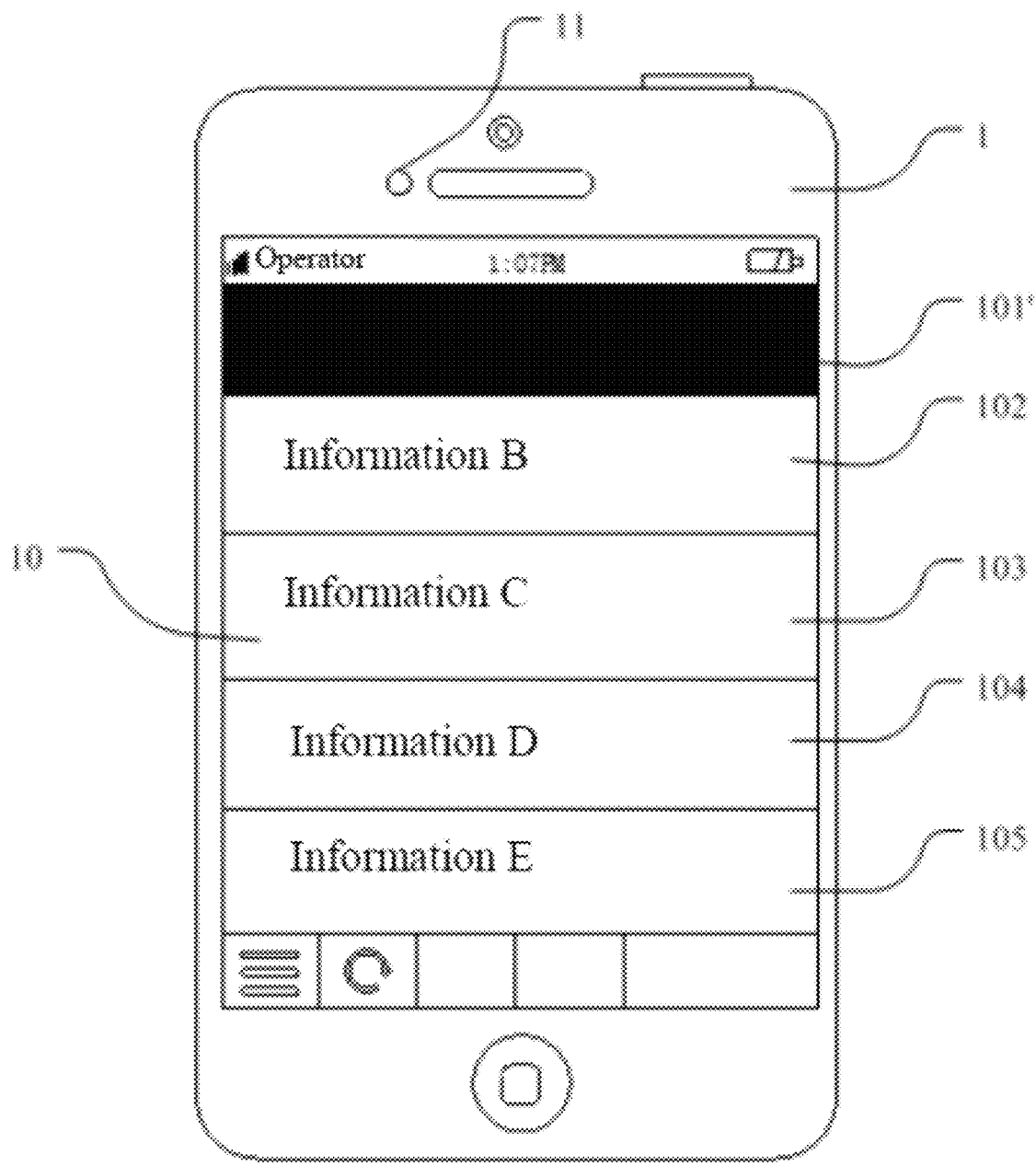
FIG. 4 is a schematic diagram of a screen display state of the electronic device after sensitive information is masked by displaying a rectangular picture.

FIG. 4 is a schematic diagram of a screen display state of the electronic device after sensitive information is masked by displaying a rectangular picture. When an event that the light intensity increases to the first threshold occurs, the area where the predefined sensitive information is located is identified. To identify the area where the sensitive information is located, a label may be set for each display area in advance, and the labels are identified when the event that the light intensity increases to the first threshold occurs; the area where the sensitive information is located may be positioned according to a label, and masking of the sensitive information is implemented by covering, in the area where the sensitive information is located, the sensitive information with a set rectangular picture 101', or masking of the sensitive information may also be implemented by replacing original sensitive information with the set rectangular picture 101' for display. Specifically, the area where the sensitive information is located is a rectangular space, and the rectangular space is determined by using a coordinate point and an area; when it is monitored that the light intensity is greater than the first threshold, a coordinate point at the lower left corner of the area where the sensitive information is located is positioned first, and then a rectangular is acquired starting from the coordinate point at the lower left corner, to mask the sensitive information.

In addition, the coordinate point may also be another position of the area where the sensitive information is located, for example, the upper left corner, the lower right corner, or the like, and may also be in other forms in practice, which are not limited in this example embodiment of the present disclosure.

Step S208: It is monitored whether the light intensity detected by the light sensor 11 decreases to a second threshold.

Step S210: When it is monitored that the light intensity decreases to the second threshold, the masked area where the sensitive information is located is identified in the screen 10, the sensitive information is displayed in the area where the sensitive information is located, and the rectangular picture 101' displayed in the area where the sensitive information is located is canceled, thus canceling masking of the area where the sensitive information is located.

Figure 5:
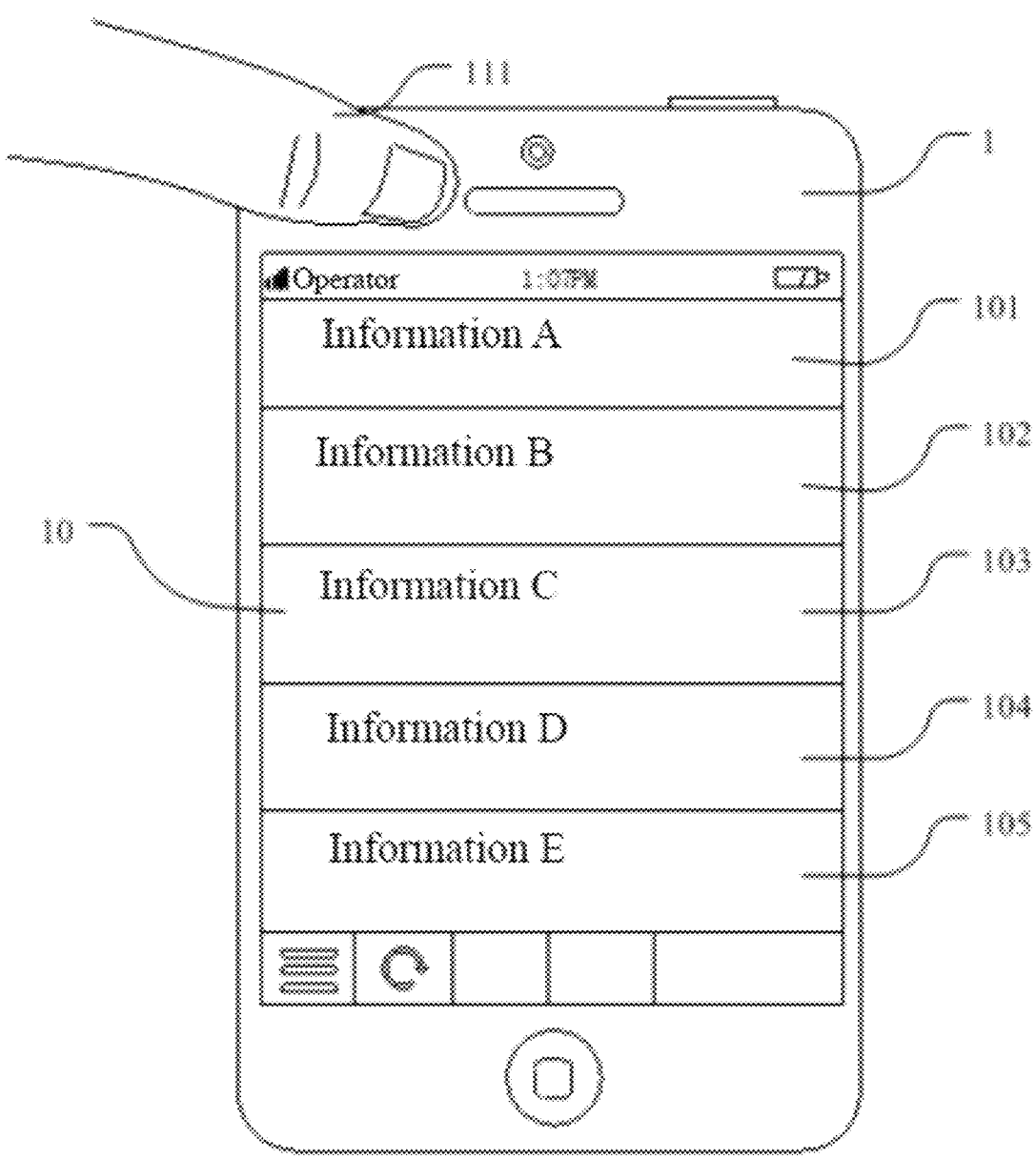
FIG. 5 is a schematic diagram of a screen display state of the electronic device after a user presses a light sensor with a finger to cancel masking.

In the screen display state shown in FIG. 4, specifically, an event that the light intensity decreases to the second threshold is triggered by covering the light sensor 11 with a finger 111, the area where the predefined sensitive information is located is identified, and masking display of the sensitive information is canceled, as shown in FIG. 5. Those skilled in the art should clearly know that a trigger manner for implementing a decrease of the light intensity detected by the light sensor 11 to the second threshold is not limited to only the manner of covering the light sensor 11 with the finger 111 shown in FIG. 5, but may be in other forms in practice, which are not limited in this example embodiment of the present disclosure.

In addition, when the finger 111 of the user is moved away from the light sensor 11, the light intensity increases gradually, and when the light sensor 11 monitors that the light intensity is lower than the first threshold, the sensitive information is continued to be displayed; and when the light sensor 11 monitors that the light intensity increases to the first threshold, step S206 is performed to mask the sensitive information.

It should be further noted that the first threshold mentioned in this example embodiment is greater than or equal to the second threshold.

Through the screen sensitive information processing method of this example embodiment, after it is monitored that light intensity increases to a first threshold, an area where sensitive information is located can be positioned, and the sensitive information is masked by displaying a rectangular picture in the area where the sensitive information is located, so that leakage of sensitive information of a user can be effectively prevented; moreover, after it is monitored that the light intensity decreases to a second threshold, masking of the area where the sensitive information is located may be canceled, thus meeting an information viewing requirement of the user, and security of information viewing is significantly improved for the user compared with the conventional techniques.

Example Embodiment 2

Figure 6:
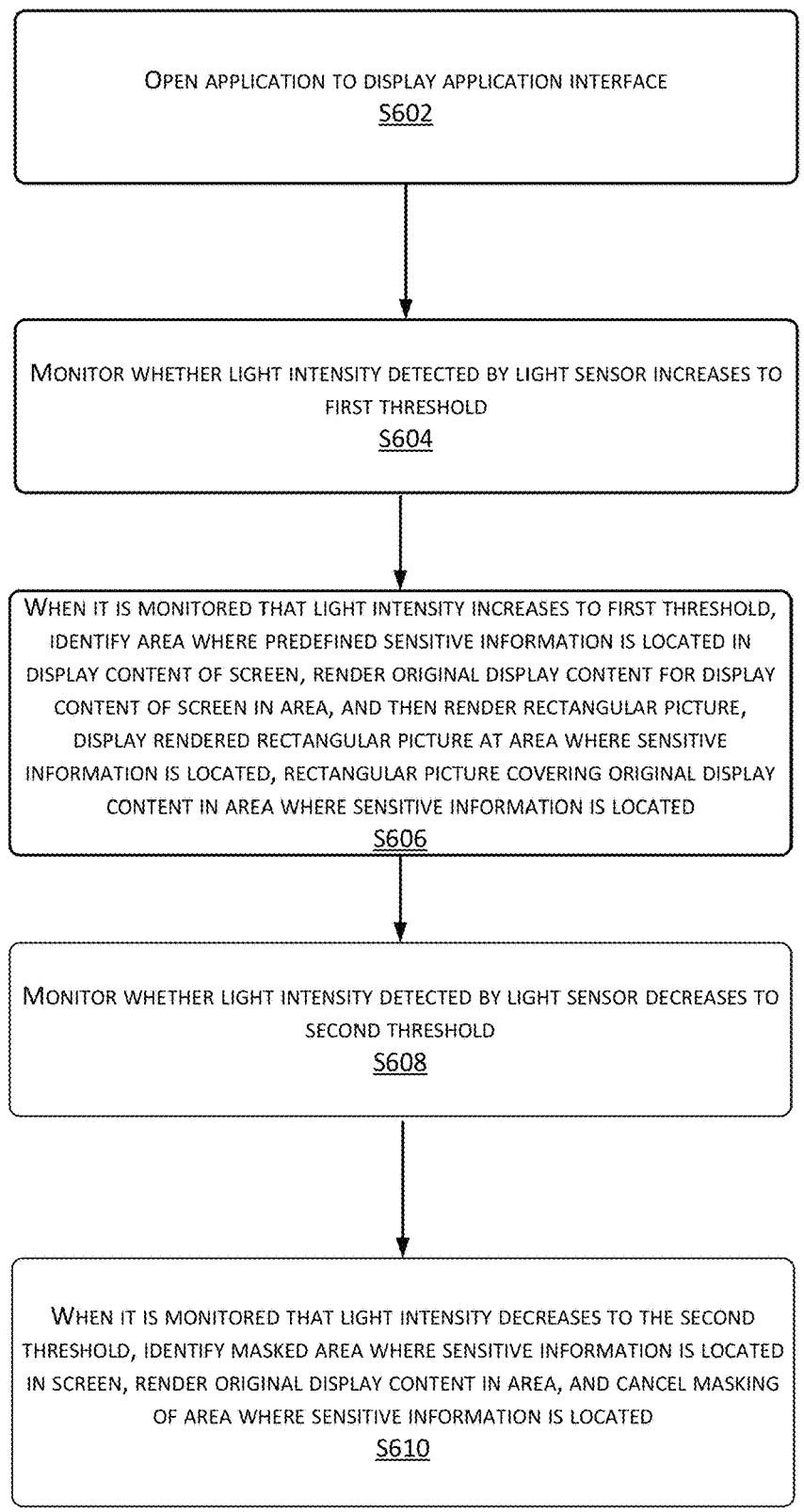
FIG. 6 is a schematic flowchart of a screen sensitive information processing method according to example embodiment 2 of the present disclosure.

FIG. 6 is a schematic flowchart of a screen sensitive information processing method according to this example embodiment. The screen sensitive information processing method may be applied to any electronic device that can display information, such as a mobile smart phone, a tablet electronic device, a portable computer (such as a notebook computer), a personal digital assistant (PDA), a laptop computer, or other devices that can display information through a screen. Applications corresponding to information displayed on the screen include, but are not limited to, a social platform application (such as Facebook, Twitter, or Weibo), an email application, a short messaging service (SMS) application, a multimedia messaging service (MMS) application, and the like.

As shown in FIG. 6, the screen sensitive information processing method includes the following steps:

Step S602: An electronic device opens an application, and a screen displays information of a current application page.

It is assumed that information displayed on the screen after the electronic device opens the application includes information A, information B, information C, information D, and information E, wherein the information A is sensitive information.

Step S604: It is monitored whether light intensity detected by a light sensor increases to a first threshold.

In practice, the current application may monitor ambient light intensity by invoking a light sensor API of the electronic device. The light sensor API of the electronic device cannot be invoked to monitor the light intensity until the application is started; therefore, when the application is just started in step S602, an initial display state of the screen is a state in which sensitive information is not masked; after the light sensor API of the electronic device is invoked, if the detected light intensity is lower than the first threshold, the current page is continued to be displayed, and if the monitored light intensity is higher than the first threshold, step S606 is performed.

Step S606: When it is monitored that the light intensity increases to the first threshold, an area where predefined sensitive information in display content of a screen is located is identified, and original display content is rendered for the display content of the screen in the area.

Based on the rendering of the original display content, a rectangular picture is rendered, the area where the sensitive information is located displays the rendered rectangular picture, and the rectangular picture covers the original display content in the area where the sensitive information is located.

In practice, to identify the area where the predefined sensitive information is located, a label may be set for each display area in advance, and the labels are identified when the event that the light intensity increases to the first threshold occurs; the area where the sensitive information is located may be positioned according to a label. Interface rendering is performed twice in the area where the sensitive information is located; the sensitive information is rendered at the first time, that is, all display content is drawn on the screen, and at the second time, a covering picture is rendered in the area where the sensitive information is located. In other words, the interface picture rendered at the second time will cover the sensitive information rendered at the first time, thus masking the sensitive information.

Step S608: It is monitored whether the light intensity detected by the light sensor decreases to a second threshold.

Step S610: When it is monitored that the light intensity decreases to the second threshold, the masked area where the sensitive information is located is identified in the screen, the original display content in the area where the sensitive information is located is rendered, and masking of the area where the sensitive information is located is canceled.

In the case where the sensitive information is masked, specifically, an event that the light intensity decreases to the second threshold is triggered by covering the light sensor with a finger, the area where the predefined sensitive information is located is identified, and masking display of the sensitive information is canceled by rendering the original sensitive content in the area. Those skilled in the art should clearly know that a trigger manner for implementing a decrease of the light intensity detected by the light sensor to the second threshold is not limited to only the manner of covering the light sensor with the finger, but may be in other forms in practice, which are not limited in this example embodiment of the present disclosure.

In addition, when the finger of the user is moved away from the light sensor, the light intensity increases gradually, and when the light sensor monitors that the light intensity is lower than the first threshold, the sensitive information is continued to be displayed; and when the light sensor monitors that the light intensity increases to the first threshold, step S606 is performed to mask the sensitive information.

It should be further noted that the first threshold mentioned in this example embodiment is greater than or equal to the second threshold.

Through the screen sensitive information processing method of this example embodiment, after it is monitored that light intensity increases to a first threshold, an area where sensitive information is located can be positioned in a predefined manner, and the sensitive information is masked by performing interface rendering twice, where the sensitive information is rendered at the first time and a covering picture is rendered at the second time, so that leakage of sensitive information of a user can be effectively prevented; moreover, after it is monitored that the light intensity decreases to a second threshold, original display content is rendered, so that masking of the area where the sensitive information is located can be canceled, thus meeting an information viewing requirement of the user, and security of information viewing is significantly improved for the user compared with the conventional techniques.

Example Embodiment 3

Figure 7:
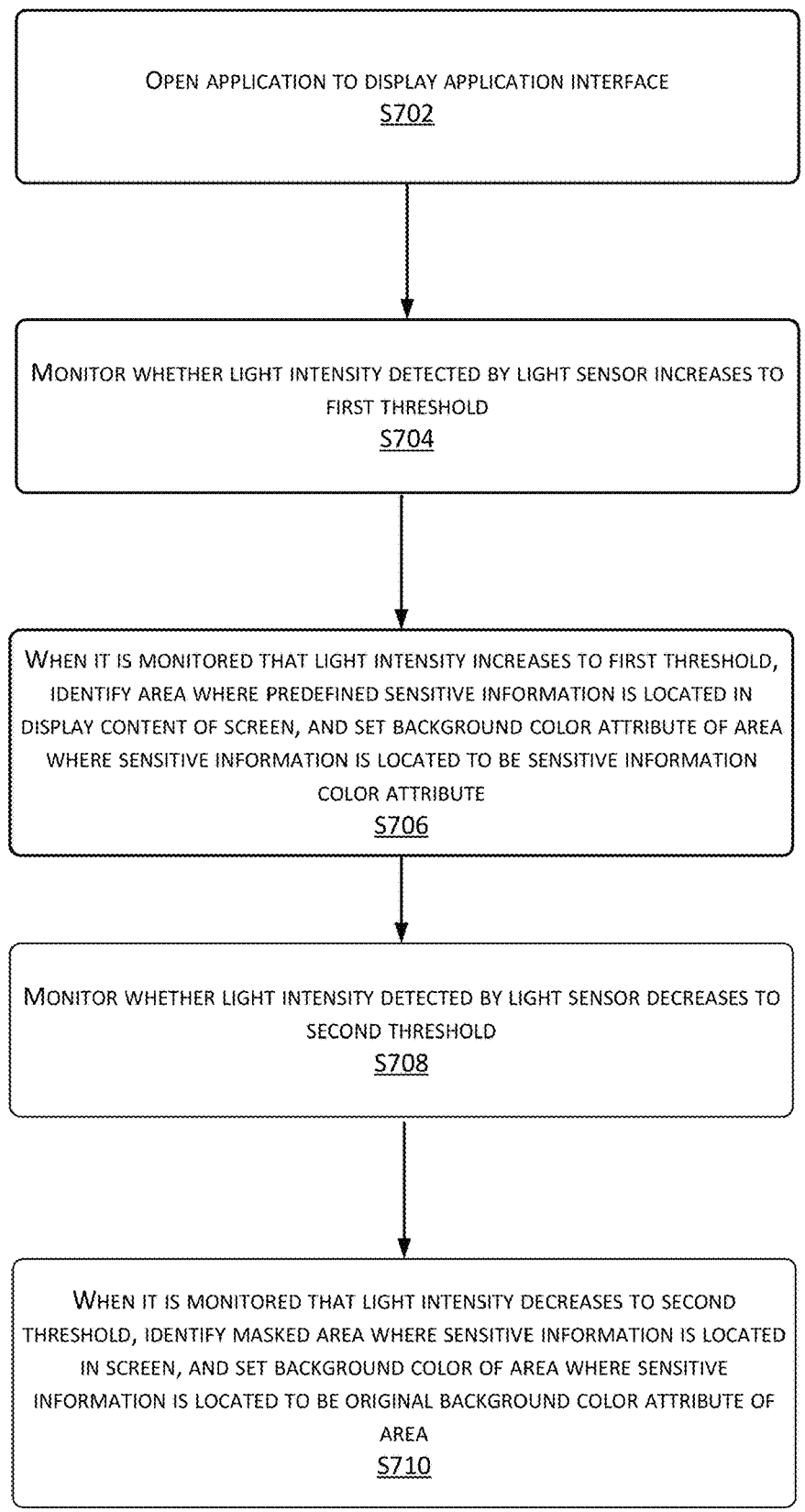
FIG. 7 is a schematic flowchart of a screen sensitive information processing method according to example embodiment 3 of the present disclosure.

FIG. 7 is a schematic flowchart of a screen sensitive information processing method according to this example embodiment. The screen sensitive information processing method may be applied to any electronic device that can display information, such as a mobile smart phone, a tablet electronic device, a portable computer (such as a notebook computer), a personal digital assistant (PDA), a laptop computer, or other devices that can display information through a screen. Applications corresponding to information displayed on the screen include, but are not limited to, a social platform application (such as Facebook, Twitter, or Weibo), an email application, a short messaging service (SMS) application, a multimedia messaging service (MMS) application, and the like.

As shown in FIG. 7, the screen sensitive information processing method includes the following steps:

Step S702: An electronic device opens an application, and a screen displays information of a current application page.

It is assumed that information displayed on the screen after the electronic device opens the application includes information A, information B, information C, information D, and information E, wherein the information A is sensitive information.

Step S704: It is monitored whether light intensity detected by a light sensor increases to a first threshold.

In practice, the current application may monitor ambient light intensity by invoking a light sensor API of the electronic device. The light sensor API of the electronic device cannot be invoked to monitor the light intensity until the application is started; therefore, when the application is just started in step S702, an initial display state of the screen is a state in which sensitive information is not masked; after the light sensor API of the electronic device is invoked, if the detected light intensity is lower than the first threshold, the current page is continued to be displayed, and if the monitored light intensity is higher than the first threshold, step S706 is performed.

Step S706: When it is monitored that the light intensity increases to the first threshold, an area where predefined sensitive information in display content of a screen is located is identified, and a background color attribute of the area where the sensitive information is located is set to be a sensitive information color attribute.

In practice, to identify the area where the predefined sensitive information is located, a label may be set for each display area in advance, and the labels are identified when the event that the light intensity increases to the first threshold occurs; the area where the sensitive information is located may be positioned according to a label, and the background color attribute of the area where the sensitive information is located is adjusted to a color attribute for sensitive information, thus masking the sensitive information.

Step S708: It is monitored whether the light intensity detected by the light sensor decreases to a second threshold.

Step S710: When it is monitored that the light intensity decreases to the second threshold, the masked area where the sensitive information is located is identified in the screen, and a background color of the area where the sensitive information is located is set to be an original background color attribute of the area.

In the case where the sensitive information is masked, specifically, an event that the light intensity decreases to the second threshold is triggered by covering the light sensor with a finger, the area where the predefined sensitive information is located is identified, and masking display of the sensitive information is canceled by recovering an original state of the background color attribute of the area where the sensitive information is located. Those skilled in the art should clearly know that a trigger manner for implementing a decrease of the light intensity detected by the light sensor to the second threshold is not limited to only the manner of covering the light sensor with the finger, but may be in other forms in practice, which are not limited in this example embodiment of the present disclosure.

In addition, when the finger of the user is moved away from the light sensor, the light intensity increases gradually, and when the light sensor monitors that the light intensity is lower than the first threshold, the sensitive information is continued to be displayed; and when the light sensor monitors that the light intensity increases to the first threshold, step S706 is performed to mask the sensitive information.

It should be further noted that the first threshold mentioned in this example embodiment is greater than or equal to the second threshold.

Through the screen sensitive information processing method of this example embodiment, after it is monitored that light intensity increases to a first threshold, an area where sensitive information is located can be positioned, and the sensitive information is masked by adjusting a background color attribute of the area where the sensitive information is located, so that leakage of sensitive information of a user can be effectively prevented; moreover, after it is monitored that the light intensity decreases to a second threshold, the background color attribute of the area where the sensitive information is located is recovered, so that masking of the area where the sensitive information is located can be canceled, thus meeting an information viewing requirement of the user, and security of information viewing is significantly improved for the user compared with the conventional techniques.

Figure 8:
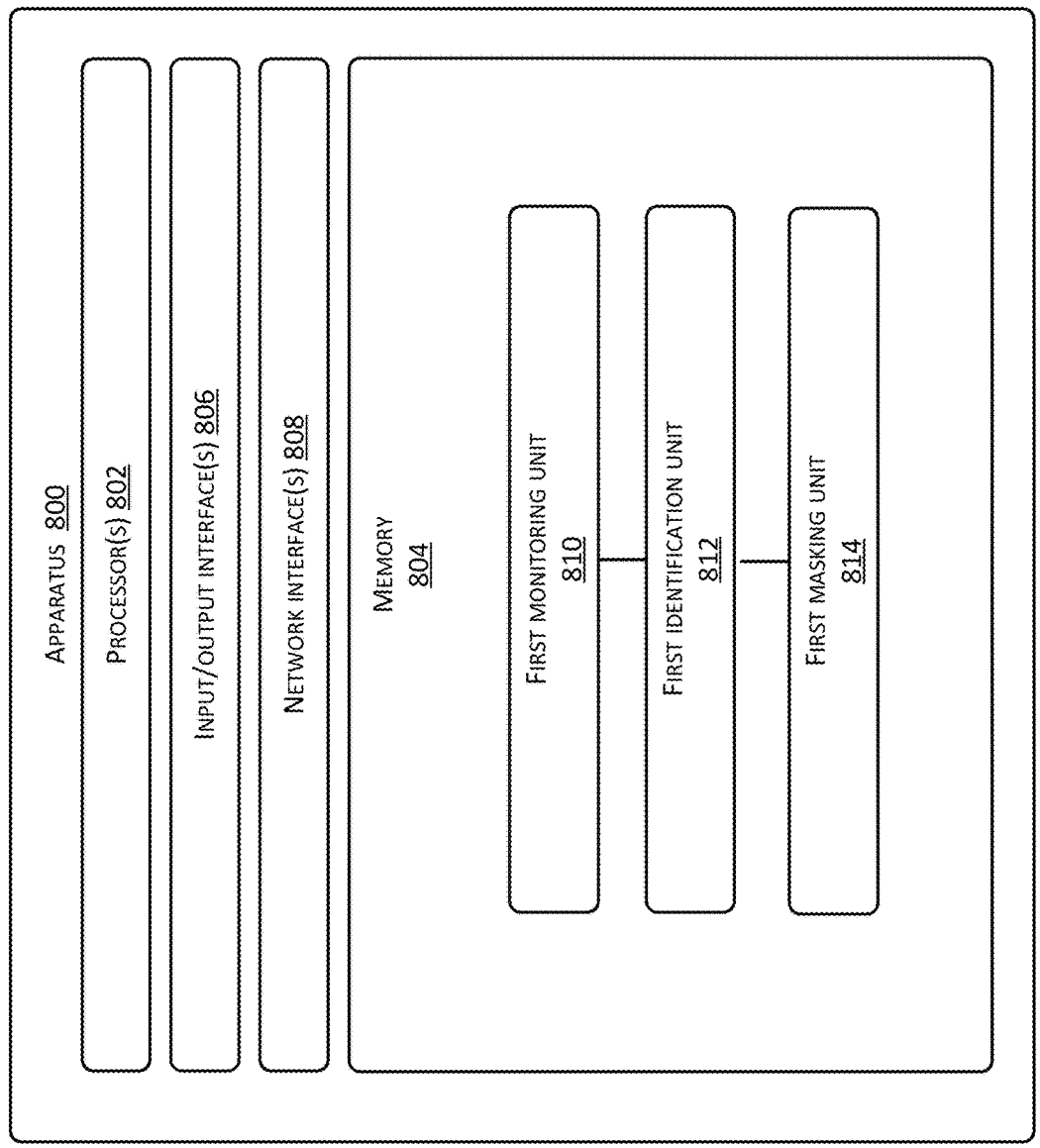
FIG. 8 is a schematic diagram of a screen sensitive information processing apparatus according to an example embodiment of the present disclosure.

An example embodiment of the present disclosure further provides a corresponding screen sensitive information processing apparatus 800, which, as shown in FIG. 8, includes one or more processor(s) 802 or data processing unit(s) and memory 804. The apparatus 800 may further include one or more input/output interface(s) 806, and network interface(s) 808. The memory 804 is an example of computer readable media.

The memory 804 may store therein a plurality of modules or units including: a first monitoring unit 810, a first identification unit 812, and a first masking unit 814, wherein the first monitoring unit 810 is configured to monitor whether light intensity detected by a light sensor increases to a first threshold; the first identification unit 812 is configured to identify, when the first monitoring unit 810 monitors that the light intensity increases to the first threshold, an area where predefined sensitive information in display content of a screen is located; and the first masking unit 814 is configured to mask, after the first identification unit 812 identifies the area where the predefined sensitive information is located in the display content of the screen, content displayed in the area where the sensitive information is located.

In addition, the apparatus provided by this example embodiment of the present disclosure further includes: a second monitoring unit, a second identification unit, and a second masking unit, wherein the second monitoring unit is configured to monitor whether the light intensity detected by the light sensor decreases to a second threshold; the second identification unit is configured to identify, when the second monitoring unit monitors that the light intensity decreases to the second threshold, the area where the predefined sensitive information is located in the display content of the screen; and the second masking unit is configured to cancel, after the second identification unit identifies the area where the predefined sensitive information is located in the display content of the screen, masking of the area where the sensitive information is located.

As can be seen, a screen sensitive information processing apparatus provided in this example embodiment, after monitoring that light intensity increases to a first threshold, can position an area where sensitive information is located, can effectively prevent leakage of sensitive information of a user by masking content displayed in the area where the sensitive information is located, and recovers a background color attribute of the area where the sensitive information is located after monitoring that the light intensity decreases to a second threshold, thus canceling masking of the area where the sensitive information is located, to meet an information viewing requirement of the user; security of information viewing is significantly improved for the user compared with the conventional techniques.

In the 1990s, a technological improvement can be distinctively classified as a hardware improvement (for example, improvement on a circuit structure such as a diode, a transistor, or a switch) or a software improvement (improvement on a method procedure). However, with the development of technology, many improvements on method procedures nowadays can be considered as direct improvements on hardware circuit structures. Almost all designers obtain corresponding hardware circuit structures by programming improved method procedures into hardware circuits. Therefore, an improvement on a method procedure can also be implemented by a physical hardware module. For example, a Programmable Logic Device (PLD) (such as a Field Programmable Gate Array (FPGA)) is such an integrated circuit, and a logic function thereof is determined by a user's programming on the device. The designer "integrates" a digital system on a PLD through programming, without asking a chip manufacturer to design and manufacture a dedicated integrated circuit chip 2. Moreover, nowadays, instead of manually manufacturing integrated circuit chips, such programming is mostly implemented by a "logic compiler", which is similar to a software compiler used in program development and writing; original code before compiling also needs to be written in a particular programming language, which is referred to as Hardware Description Language (HDL), and there are many kinds rather than only one kind of HDL, for example, Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), and the like; Very-High-Speed Integrated Circuit Hardware Description Language (VHDL) and Verilog2 are most commonly used at present. Those skilled in the art should also clearly know that, by logically programming a method procedure by using the several hardware description languages described above and programming the method procedure into an integrated circuit, a hardware circuit for implementing the logic method procedure can be easily obtained.

A controller can be implemented in any suitable manner, for example, the controller may employ forms such as a microprocessor or processor as well as a computer readable medium storing computer readable program code (such as software or firmware) executable by the processor (microprocessor), a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone LabsC8051F320, and a memory controller may also be implemented as a part of control logic of a memory.

Those skilled in the art are also aware that, in addition to implementing the controller by means of pure computer readable program code, it is totally possible to logically programming method steps such that the controller implements the same function in the forms of a logic gate, a switch, an ASIC, a programmable logic controller, an embedded microcontroller, and the like. Therefore, such a controller may be regarded as a kind of hardware component, and the apparatus included therein for implementing various functions may also be regarded as a structure inside the hardware component. Alternatively, the apparatus for implementing various functions may even be regarded as not only software modules for implementing the method but also the structure in the hardware component.

The system, apparatus, modules or units illustrated in the foregoing example embodiment may be specifically implemented by a computer chip or an entity, or implemented by a product having a particular function.

For ease of description, when the apparatus is described, it is divided into various units based on functions and the units are described respectively. Of course, functions of various units may be implemented in one or more software and/or hardware during implementation of the present disclosure.

Through the foregoing description about the implementations, those skilled in the art can clearly understand that the present disclosure may be implemented by software plus a necessary universal hardware platform. Based on such an understanding, the technical solutions of the present disclosure essentially, or the part contributing to the conventional techniques may be implemented in the form of a software product. In a typical configuration, a computation device includes one or more central processing units (CPUs), I/O interfaces, network interfaces, and a memory. The computer software product may include several instructions for enabling a computer device (which may be a personal computer, a server, a network device, or the like) to execute the method in each example embodiment of the present disclosure or in some parts of the example embodiment. The computer software product may be stored in a memory. The memory may include computer readable media such as a volatile memory, a Random Access Memory (RAM), and/or non-volatile memory, e.g., Read-Only Memory (ROM) or flash RAM. The memory is an example of a computer readable medium. Computer readable media include permanent, nonpermanent, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to the computation device. According to the definitions herein, the computer readable media exclude non-transitory computer readable medium (transitory media), such as modulated data signals and carriers.

The example embodiments in this specification are described in a progressive manner, for same or similar parts in the example embodiments, reference may be made to each other, and each example embodiment focuses on a difference from other example embodiments. Especially, description of the system example embodiment is relatively simple because it is substantially similar to the method example embodiment, and for related parts, reference may be made to the partial description of the method example embodiment.

The present disclosure may be applied to a lot of general-purpose or special-purpose computer system environments or configurations, for example, a personal computer, a server computer, a handheld device or portable device, a tablet device, a multi-processor system, a microprocessor-based system, a set-top box, a programmable consumer electronic device, a network PC, a minicomputer, a mainframe computer, a distributed computing environment including any foregoing system or device, and the like.

The present disclosure may be described in a general context, such as a program module, of a computer executable instruction executed by a computer. Generally, the program module includes a routine, a program, an object, an element, a data structure, a class, and the like for executing a specific task or implementing a specific abstract data type. The present disclosure may also be practiced in distributed computing environments, and in these distributed computing environments, tasks are executed by a remote processing device that is connected through a communications network. In the distributed computing environments, the program module may be located in local and remote computer storage media including a storage device.

Although the present disclosure has been depicted through example embodiments, those of ordinary skill in the art should know that the present disclosure has many variations and modifications without departing from the spirit of the present disclosure, and it is desired that the appended claims include these variations and modifications without departing from the spirit of the present disclosure.

What is claimed is:
1. A method comprising:
monitoring that light intensity detected by a light sensor increases to a first threshold;

identifying an area where predefined sensitive information in display content of a screen is located;

masking content displayed in the area where the sensitive information is located by generating a rectangle starting at a coordinate point at a corner of the area where the sensitive information is located in response to monitoring that the light intensity detected by the light sensor increases to the first threshold, the masking including setting a background color attribute of the rectangle to be a sensitive information color attribute without changing the sensitive information color attribute;

monitoring that the light intensity detected by the light sensor decreases to a second threshold, the first threshold being greater than or equal to the second threshold;

identifying the masked area where the sensitive information is located; and canceling masking of the area where the sensitive information is located in response to monitoring that the light intensity decreases to the second threshold without requiring an instruction from a user, the canceling including setting the background color of the rectangle to be an original background color attribute of the area without changing the sensitive information color attribute, and re-displaying the sensitive information of the area.

2. The method of claim 1, wherein the masking content displayed in the area where the sensitive information is located includes:

displaying a content in the area where the sensitive information is located.

3. The method of claim 2, wherein the content is a rectangular picture.

4. The method of claim 2, wherein the content covers original display content in the area where the sensitive information is located.

5. The method of claim 2, wherein re-displaying the sensitive information of the area includes:

rendering original display content in the display content of the screen.

6. The method of claim 1, wherein the masking content displayed in the area where the sensitive information is located includes:

rendering a picture; and displaying the rendered picture in the area where the sensitive information is located.

7. The method of claim 6, wherein the picture is a rectangular picture.

8. The method of claim 7, wherein the rectangular picture covers original display content in the area where the sensitive information is located.

9. The method of claim 1, wherein the sensitive information color attribute refers to a color attribute for sensitive information that masks the sensitive information.

10. An apparatus comprising:
one or more processors; and
one or more memories stored thereon computer-executable instructions that, when executed by the one or more processors, cause the one or more processors to perform acts comprising:

monitoring that light intensity detected by a light sensor increases to a first threshold;

identifying an area where predefined sensitive information in display content of a screen is located;

masking content displayed in the area where the sensitive information is located by generating a rectangle starting at a coordinate point at a corner of the area where the sensitive information is located in response to monitoring that the light intensity detected by the light sensor increases to a first threshold, the masking including setting a background color attribute of the rectangle to be a sensitive information color attribute without changing the sensitive information color attribute;

monitoring that the light intensity detected by the light sensor decreases to a second threshold, the first threshold being greater than or equal to the second threshold;

identifying the masked area where the sensitive information is located; and canceling masking of the area where the sensitive information is located in response to monitoring that the light intensity decreases to the second threshold without requiring an instruction from a user, the canceling including setting the background color of the rectangle to be an original background color attribute of the area without changing the sensitive information color attribute, and re-displaying the sensitive information of the area.

11. The apparatus of claim 10, wherein the masking content displayed in the area where the sensitive information is located includes:

displaying a content in the area where the sensitive information is located.

12. The apparatus of claim 11, wherein the content is a rectangular picture.

13. The apparatus of claim 12, wherein the content covers original display content in the area where the sensitive information is located.

14. The apparatus of claim 10, wherein the masking content displayed in the area where the sensitive information is located includes:

rendering a picture; and displaying the rendered picture in the area where the sensitive information is located.

15. One or more memories stored thereon computer-executable instructions that, when executed by one or more processors, cause the one or more processors to perform acts comprising:

monitoring that light intensity detected by a light sensor increases to a first threshold;

identifying an area where predefined sensitive information in display content of a screen is located;

masking content displayed in the area where the sensitive information is located by generating a rectangle starting at a coordinate point at a corner of the area where the sensitive information is located in response to monitoring that the light intensity detected by the light sensor increases to a first threshold, the masking including setting a background color attribute of the area where the sensitive information is located to be a sensitive information color attribute that that masks the sensitive information without changing the sensitive information color attribute;

monitoring that the light intensity detected by the light sensor decreases to a second threshold, the first threshold being greater than or equal to the second threshold; and canceling masking of the area where the sensitive information is located in response to monitoring that the light intensity decreases to the second threshold without requiring an instruction from a user, the canceling including setting the background color of the area where the sensitive information is located to be an original background color attribute of the area without changing the sensitive information color attribute, and re-displaying the sensitive information of the area.

16. The apparatus of claim 14, wherein the picture is a rectangular picture.

* * * * *